(12) United States Patent
Chen et al.

(10) Patent No.: US 11,122,483 B2
(45) Date of Patent: Sep. 14, 2021

(54) NETWORK STANDARD SWITCHING METHOD AND APPARATUS, AND DEVICE

(71) Applicant: Huawei Technologies Co., Ltd., Shenzhen (CN)

(72) Inventors: Xiaojuan Chen, Wuhan (CN); Shuai Shi, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/462,709

(22) PCT Filed: Jan. 13, 2017

(86) PCT No.: PCT/CN2017/071183
§ 371 (c)(1),
(2) Date: May 21, 2019

(87) PCT Pub. No.: WO2018/090480
PCT Pub. Date: May 24, 2018

(65) Prior Publication Data
US 2019/0364476 A1 Nov. 28, 2019

(30) Foreign Application Priority Data
Nov. 21, 2016 (CN) .......................... 201611037468.3

(51) Int. Cl.
*H04W 36/14* (2009.01)
*H04W 36/00* (2009.01)
(Continued)

(52) U.S. Cl.
CPC ......... *H04W 36/14* (2013.01); *H04L 67/2842* (2013.01); *H04W 36/00837* (2018.08);
(Continued)

(58) Field of Classification Search
CPC ........... H04W 36/14; H04W 36/00837; H04W 36/02; H04W 36/08; H04W 36/36;
(Continued)

(56) References Cited

U.S. PATENT DOCUMENTS

| 8,218,500 B2 | 7/2012 | Kangude et al. |
| 8,284,701 B2 | 10/2012 | Vikberg et al. |

(Continued)

FOREIGN PATENT DOCUMENTS

| CN | 101888675 A | 11/2010 |
| CN | 103269504 A | 8/2013 |

(Continued)

OTHER PUBLICATIONS

Machine Translation and Abstract of Chinese Publication No. CN101888675, Nov. 17, 2010, 16 pages.
(Continued)

*Primary Examiner* — Zhensheng Zhang
(74) *Attorney, Agent, or Firm* — Conley Rose, P.C.

(57) ABSTRACT

A network standard switching method includes obtaining a network standard switching instruction including a target priority. The network standard switching instruction instructs a terminal device to be handed over to a target network whose standard is a target standard, and a priority of the target network is greater than a priority of a network in which the terminal device is currently located. The method further includes releasing a network link between the terminal device and a currently accessed first base station, intercepting and caching to-be-sent application-layer data of the terminal device, discarding a paging message in a packet switched (PS) domain received from a first-priority network to the terminal device, and handing over to the target network.

20 Claims, 6 Drawing Sheets

(51) Int. Cl.
*H04L 29/08* (2006.01)
*H04W 36/08* (2009.01)
*H04W 68/02* (2009.01)
*H04L 29/06* (2006.01)

(52) U.S. Cl.
CPC ........... *H04W 36/08* (2013.01); *H04W 68/02* (2013.01); *H04L 69/16* (2013.01); *H04L 69/329* (2013.01)

(58) Field of Classification Search
CPC .... H04W 68/02; H04L 67/2842; H04L 69/16; H04L 69/329
See application file for complete search history.

(56) References Cited

U.S. PATENT DOCUMENTS

| | | | | |
|---|---|---|---|---|
| 2002/0176382 | A1* | 11/2002 | Madour | H04W 76/22 370/331 |
| 2005/0180419 | A1* | 8/2005 | Park | H04L 47/193 370/389 |
| 2011/0317661 | A1* | 12/2011 | Tenny | H04W 36/0022 370/331 |
| 2015/0195837 | A1* | 7/2015 | Fuse | H04L 5/0098 370/329 |
| 2016/0127988 | A1* | 5/2016 | Yao | H04W 48/20 370/338 |
| 2017/0135004 | A1 | 5/2017 | Xiong et al. | |
| 2019/0132794 | A1* | 5/2019 | Geng | H04W 76/27 |

FOREIGN PATENT DOCUMENTS

| | | |
|---|---|---|
| CN | 103596230 A | 2/2014 |
| WO | 2010048843 A1 | 5/2010 |
| WO | 2010130135 A1 | 11/2010 |
| WO | 2012152128 A1 | 11/2012 |
| WO | 2016011624 A1 | 1/2016 |

OTHER PUBLICATIONS

Machine Translation and Abstract of Chinese Publication No. CN103269504, Aug. 28, 2013, 22 pages.
Machine Translation and Abstract of Chinese Publication No. CN103596230, Feb. 19, 2014, 15 pages.
Machine Translation and Abstract of International Publication No. WO2010048843, May 6, 2010, 35 pages.
Machine Translation and Abstract of International Publication No. WO2010130135, Nov. 18, 2010, 18 pages.
Machine Translation and Abstract of International Publication No. WO2012152128, Nov. 15, 2012, 21 pages.
Foreign Communication From a Counterpart Application, European Application No. 17871573.6, Extended European Search Report dated Jul. 8, 2019, 9 pages.
Foreign Communication From a Counterpart Application, PCT Application No. PCT/CN2017/071183, English Translation of International Search Report dated Aug. 24, 2017, 3 pages.
Foreign Communication From a Counterpart Application, PCT Application No. PCT/CN2017/071183, English Translation of Written Opinion dated Aug. 24, 2017, 4 pages.

* cited by examiner

NETWORK STANDARD SWITCHING METHOD AND APPARATUS, AND DEVICE

CROSS-REFERENCE TO RELATED APPLICATIONS

This application is a U.S. National Stage of International Patent Application No. PCT/CN2017/071183 filed on Jan. 13, 2017, which claims priority to Chinese Patent Application No. 201611037468.3 filed on Nov. 21, 2016. Both of the aforementioned applications are hereby incorporated by reference in their entireties.

TECHNICAL FIELD

Embodiments of the present invention relate to the field of communications technologies, and in particular, to a network standard switching method and apparatus, and a device.

BACKGROUND

Currently, with continuous development of communications technologies, terminal devices can use more network types (for example, 2G, 3G, and 4G networks), and can be handed over between different networks based on actual requirements.

In an actual application process, priorities of the 2G, 3G, and 4G networks successively increase. When a terminal device needs to be handed over from a low-priority network to a high-priority network, and if the terminal device does not currently transmit data, the terminal device directly searches for the high-priority high-priority network, and accesses the high-priority high-priority network. If the terminal device currently transmits data, the terminal device usually forcibly disconnects a Packet Data Protocol (Packet Data Protocol, PDP for short) or public data network (Public Data Network, PDN for short), to disconnect a network link on which the data is currently transmitted, resulting in loss of the transmitted data and user service interruption. Consequently, reliability of network standard switching is relatively poor.

SUMMARY

Embodiments of the present invention provide a network standard switching method and apparatus, and a device, to improve reliability of network standard switching.

According to a first aspect, an embodiment of the present invention provides a network standard switching method. After a terminal device obtains a network standard switching instruction used to instruct the terminal device to be handed over to a target network, where a priority of the target network is greater than a first priority of a network in which the terminal device is currently located, the terminal device releases a network link between the terminal device and a currently accessed first base station, intercepts and caches to-be-sent application-layer data of the terminal device, discards a paging message in a packet switched PS domain that is sent by the first-priority network to the terminal device, and hands over to the target network.

In the foregoing process, in a process in which the terminal device is handed over to a high-priority network, the terminal device intercepts and caches uplink application-layer data needing to be sent, and after network handover succeeds, further sends the intercepted uplink application-layer data, thereby avoiding loss of the uplink data. A second base station accessed by the terminal device after the handover may perform transfer processing with the first base station, to obtain downlink data not successfully sent to the terminal device by the first base station, and send the downlink data to the terminal device, thereby avoiding loss of the downlink data.

The terminal device releases the network link between the terminal device and the currently accessed first base station, that is, the terminal device releases a network link between the terminal device and the currently accessed first-priority network (releasing an access-layer connection between the terminal device and the first-priority network). Optionally, the network link between the terminal device and the currently accessed first-priority network may be related to a plurality of network devices, for example, a base station, a relay device, and a control device.

For example, the network currently accessed by the terminal device is the first-priority network (for example, a 3G network such as WCDMA). After receiving the network standard switching instruction that is entered by a user (for example, the user turns on a "4G network switch") to hand over to a high-priority network (for example, a 4G network), the terminal device releases the network link between the terminal device and the first-priority network (the 3G network) currently accessed, intercepts and caches the to-be-sent application-layer data of the terminal device, discards the paging message in the packet switched PS domain that is sent by the first-priority network to the terminal device, and hands over to the target network.

In a possible implementation, before the releasing a network link between the terminal device and a currently accessed first base station, the method further includes: obtaining an uplink data volume and a downlink data volume that correspond to the terminal device in a preset time period; and determining that the uplink data volume is less than a first threshold and the downlink data volume is less than a second threshold. Network handover is performed only when a data volume transmitted by the terminal device is relatively small. In this way, impact of the network handover on a user service can be reduced, thereby further improving reliability of the network handover.

Optionally, if the uplink data volume is greater than or equal to the first threshold or the downlink data volume is greater than or equal to the second threshold, before releasing the network link between the terminal device and the currently accessed first base station, the terminal device obtains the uplink data volume and the downlink data volume of the terminal device in the preset time period at intervals of a preset time length, until the obtained uplink data volume is less than the first threshold and the obtained downlink data volume is less than the second threshold.

In another possible implementation, the to-be-sent application-layer data of the terminal device may be intercepted and cached by using the following feasible implementation: sending an application-layer data interception instruction to a Transmission Control Protocol TCP/Internet Protocol IP kernel of the terminal device by using a modem of the terminal device, so that the TCP/IP kernel of the terminal device caches the to-be-sent application-layer data.

In another possible implementation, the terminal device may be handed over to the target network by using the following feasible implementation: searching for the target network; determining a target base station corresponding to the target network; and requesting to establish a network link with the target base station.

In another possible implementation, after being handed over to the target network, the terminal device may further send the cached to-be-sent application-layer data to the target base station by using the target network, thereby ensuring that the uplink data is not lost.

According to a second aspect, an embodiment of the present invention provides a network standard switching apparatus, including an obtaining module, a link processing module, a data processing module, and a handover module.

The obtaining module is configured to obtain a network standard switching instruction. The network standard switching instruction is used to instruct a terminal device to be handed over to a target network whose standard is a target standard, and a priority of the target network is greater than a first priority of a network in which the terminal device is currently located.

The link processing module is configured to release a network link between the terminal device and a currently accessed first base station.

The data processing module is configured to: intercept and cache to-be-sent application-layer data of the terminal device, and discard a paging message in a packet switched PS domain that is sent by the first-priority network to the terminal device.

The handover module is configured to hand over the terminal device to the target network.

In a possible implementation, before the link processing module releases the network link between the terminal device and the currently accessed first base station, the obtaining module is further configured to:

obtain an uplink data volume and a downlink data volume that correspond to the terminal device in a preset time period; and determine that the uplink data volume is less than a first threshold and the downlink data volume is less than a second threshold.

In another possible implementation, when the obtaining module determines that the uplink data volume is greater than or equal to the first threshold or the downlink data volume is greater than or equal to the second threshold, and before the link processing module releases the network link between the terminal device and the currently accessed first base station, the obtaining module is further configured to:

obtain the uplink data volume and the downlink data volume of the terminal device in the preset time period at intervals of a preset time length, until the obtained uplink data volume is less than the first threshold and the obtained downlink data volume is less than the second threshold.

In another possible implementation, the data processing module is specifically configured to:

send an application-layer data interception instruction to a Transmission Control Protocol TCP/Internet Protocol IP kernel of the terminal device by using a modem of the terminal device, so that the TCP/IP kernel of the terminal device caches the to-be-sent application-layer data.

In another possible implementation, the handover module is specifically configured to:

search for the target network;

determine a target base station corresponding to the target network; and request to establish a network link with the target base station.

In another possible implementation, the apparatus further includes a sending module.

The sending module is configured to: after the handover module hands over the terminal device to the target network, send the cached to-be-sent application-layer data to the target base station by using the target network.

According to a third aspect, an embodiment of the present invention provides a terminal device, including a processor, a memory, and a communications bus. The memory is configured to store a program instruction, the communications bus is configured to implement a connection between components, and the processor is configured to: read the program instruction in the memory, and perform the following operations:

obtaining a network standard switching instruction, where the network standard switching instruction is used to instruct the terminal device to be handed over to a target network whose standard is a target standard, and a priority of the target network is greater than a first priority of a network in which the terminal device is currently located; and releasing a network link between the terminal device and a currently accessed first base station, intercepting and caching to-be-sent application-layer data of the terminal device, discarding a paging message in a packet switched PS domain that is sent by the first-priority network to the terminal device, and handing over the terminal device to the target network.

In a possible implementation, before the processor releases the network link between the terminal device and the currently accessed first base station, the processor is further configured to:

obtain an uplink data volume and a downlink data volume that correspond to the terminal device in a preset time period; and determine that the uplink data volume is less than a first threshold and the downlink data volume is less than a second threshold.

In another possible implementation, when the processor determines that the uplink data volume is greater than or equal to the first threshold or the downlink data volume is greater than or equal to the second threshold, and before the processor releases the network link between the terminal device and the currently accessed first base station, the processor is further configured to:

obtain the uplink data volume and the downlink data volume of the terminal device in the preset time period at intervals of a preset time length, until the obtained uplink data volume is less than the first threshold and the obtained downlink data volume is less than the second threshold.

In another possible implementation, the processor is specifically configured to:

send an application-layer data interception instruction to a Transmission Control Protocol TCP/Internet Protocol IP kernel of the terminal device by using a modem of the terminal device, so that the TCP/IP kernel of the terminal device caches the to-be-sent application-layer data.

In another possible implementation, the processor is specifically configured to:

search for the target network;

determine a target base station corresponding to the target network; and request to establish a network link with the target base station.

In another possible implementation, the terminal device further includes a transmitter.

The transmitter is configured to: after the processor hands over the terminal device to the target network, send the cached to-be-sent application-layer data to the target base station by using the target network.

According to the network standard switching method and apparatus, and the device that are provided in the embodiments of the present invention, in a process in which the terminal device is handed over to a high-priority network, the terminal device intercepts and caches the uplink application-layer data needing to be sent, and after the network handover succeeds, further sends the intercepted uplink application-layer data, thereby avoiding the loss of the uplink data. The second base station accessed by the terminal device after the handover may perform transfer processing with the first base station, to obtain the downlink data not successfully sent to the terminal device by the first base station, and send the downlink data to the terminal device, thereby avoiding the loss of the downlink data. In the foregoing process, the network handover is performed in a process of transmitting a small amount of data by the terminal device, and the loss of the uplink data and the downlink can be avoided, thereby improving reliability of the network handover.

DESCRIPTION OF EMBODIMENTS

Figures 1, 2:
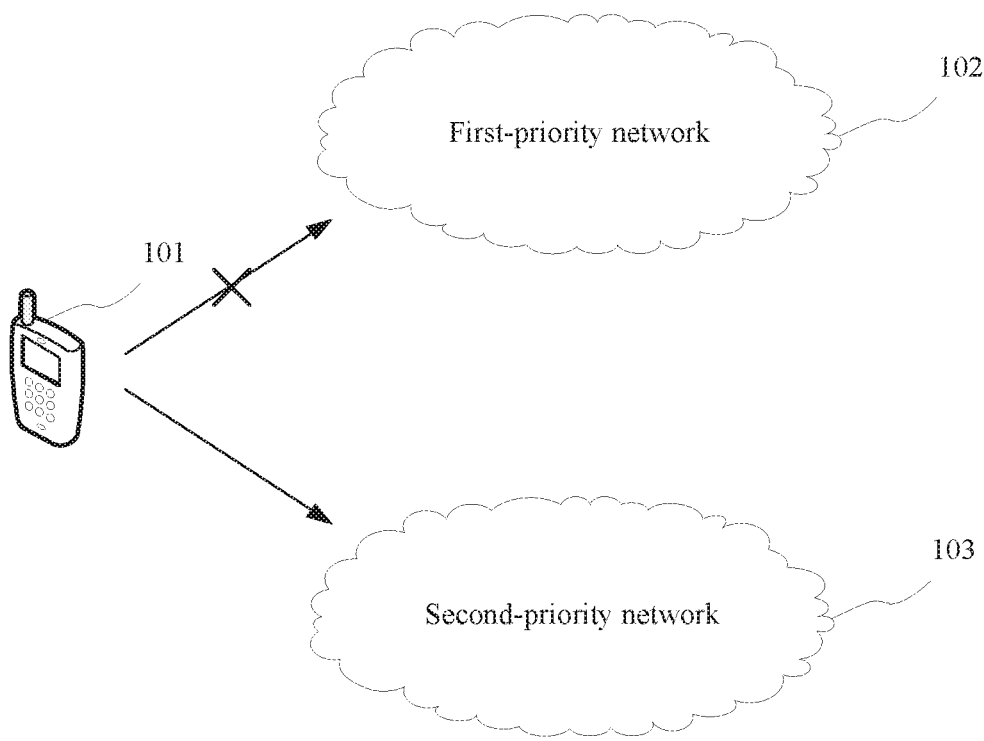
FIG. 1 is a schematic diagram of an application scenario of a network standard switching method according to an embodiment of the present invention.
FIG. 2 is a first schematic flowchart of a network standard switching method according to an embodiment of the present invention.

FIG. 1 is a schematic diagram of an application scenario of a network standard switching method according to an embodiment of the present invention. Referring to FIG. 1, the application scenario includes a terminal device 101, a first-priority network 102, and a second-priority network 103. The terminal device 101 may be a device such as a mobile phone or a computer. A priority of the second-priority network 103 is higher than a priority of the first-priority network 102. The terminal device 101 currently accesses the first-priority network 102, and the terminal device 101 needs to be handed over to the second-priority network 103. The first-priority network 102 and the second-priority network 103 may be a Code Division Multiple Access (Code Division Multiple Access, CDMA for short) network, a Wideband Code Division Multiple Access (Wideband Code Division Multiple Access, WCDMA for short) network, and the like. A priority of a network is related to a network standard. For example, a priority of a 2G network may be 1, a priority of a 3G network may be 2, and a priority of a 4G network may be 3.

In this application, when needing to be handed over from a low-priority network to a high-priority network, a terminal device disconnects a network link between the terminal device and a currently accessed base station, intercepts and caches uplink data needing to be sent, and discards a paging message in a packet switched (Packet Switched, PS for short) domain that is sent by the low-priority network. After network handover succeeds, the terminal device further sends the intercepted uplink data, thereby avoiding loss of the uplink data. Further, a network to which the terminal device is handed over further performs transfer processing with a network from which the terminal device is handed over, so that the network to which the terminal device is handed over can resend, to the terminal device, downlink data not successfully sent by the network from which the terminal device is handed over, thereby avoiding loss of the downlink data.

Specific embodiments are used below to describe in detail the technical solutions of this application. It should be noted that the following several specific embodiments may be combined with each other, and a same or similar concept or process may not be described repeatedly in some embodiments.

FIG. 2 is a first schematic flowchart of a network standard switching method according to an embodiment of the present invention. The method may be performed by a terminal device. Referring to FIG. 2, the method may include the following steps.

S201: Obtain a network standard switching instruction, where the network standard switching instruction is used to instruct the terminal device to be handed over to a target network whose standard is a target standard, and a priority of the target network is greater than a first priority of a network in which the terminal device is currently located.

Optionally, the network standard switching instruction may be generated by the terminal device based on an operation entered by a user in the terminal device. Specifically, when needing to hand over a network accessed by the terminal device to a network of a higher priority, the user may select, in the terminal device, the target standard of the target network needing to be handed over to, so that the terminal device generates the network standard switching instruction. Optionally, the network standard switching instruction may include the target standard. A process of selecting the target network by the user is described below in detail with reference to FIG. 3.

Figure 3:
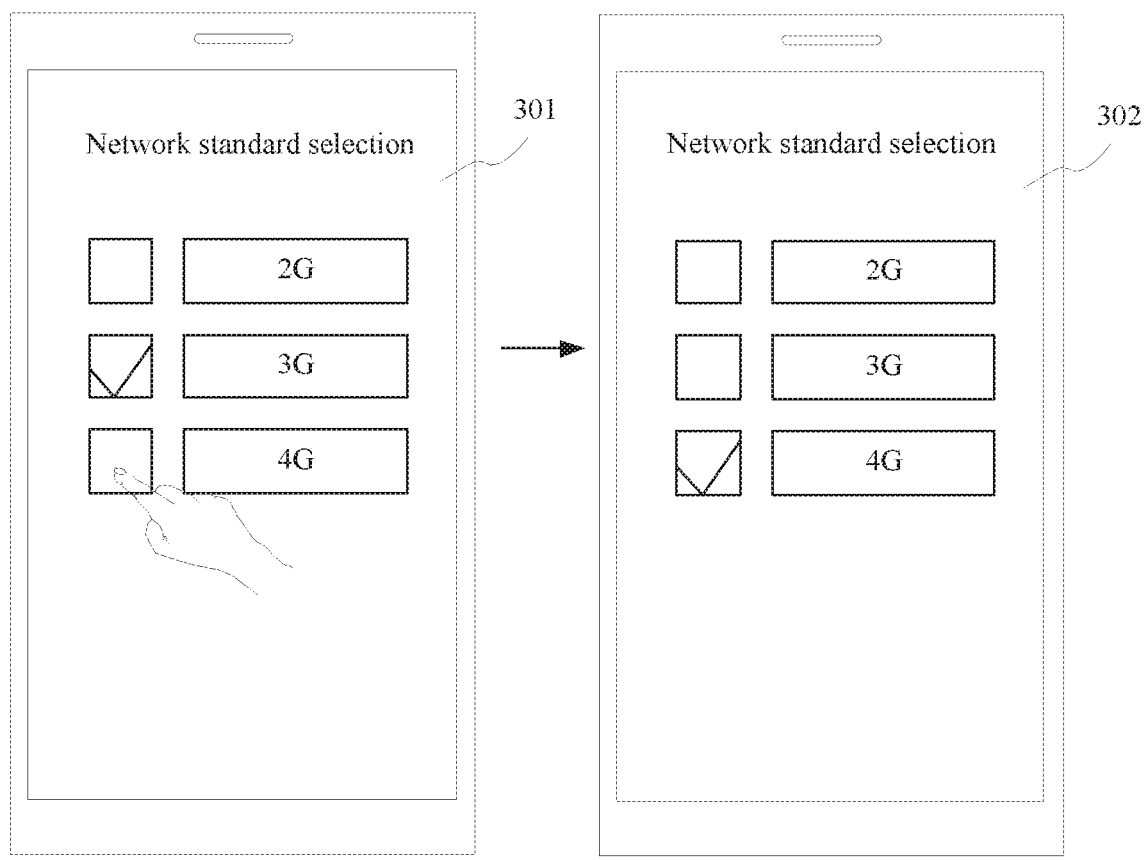
FIG. 3 is a schematic structural diagram of a terminal device according to an embodiment of the present invention.

FIG. 3 is a schematic structural diagram of a terminal device according to an embodiment of the present invention. Referring to FIG. 3, selection boxes of a plurality of network standards are set in the terminal device. The user may perform a tap operation on a selection box of any network standard. Only one of the three selection boxes is selected at a same time.

Referring to an interface 301, a network currently accessed by the terminal device is a 2G network, and a selection box corresponding to the 2G network is in a selected state. When needing to connect the terminal device to a 3G network, the user may perform a tap operation on a selection box corresponding to the 3G network, to enter the target standard in the terminal device. The terminal device generates the network standard switching instruction based on the target standard (the 3G network) entered by the user. Optionally, the network standard switching instruction may include the target standard (the 3G network).

Optional, in a running process, the terminal device may further automatically measure a high-priority network. When obtaining a high-priority network (having a priority higher than a priority of the network currently accessed by the terminal device) through measurement, the terminal device may automatically generate the network standard switching instruction. For example, assuming that the network currently accessed by the terminal device is a 2G network, in the running process of the terminal device, the terminal device measures a high-priority network (for example, 3G or 4G) in real time or periodically. When obtaining the 3G network through measurement, the terminal device generates a network standard switching instruction including "3G" (a target priority).

Certainly, the terminal device may further obtain the network standard switching instruction by using another feasible implementation. This is not specifically limited in this embodiment of the present invention.

S202: Release a network link between the terminal device and a currently accessed first base station, intercept and cache to-be-sent application-layer data of the terminal device, discard a paging message in a PS domain that is sent by the first-priority network to the terminal device, and hand over to the target network.

Optionally, the terminal device may release, by using the following feasible implementation, the network link between the terminal device and the currently accessed first base station: sending, by the terminal device, a link release request to the first base station by using a modem of the terminal device, to release the network link between the terminal device and the first base station.

For example, if the network in which the terminal device is currently located is a CDMA network, the terminal device may send a connection close request to the first base station, to release the network link between the terminal device and the first base station. If the network in which the terminal device is currently located is a WCDMA network, the terminal device may send a signaling connection release indication to the first base station, to release the network link between the terminal device and the first base station.

Specifically, in the CDMA network, when the terminal device receives the network standard switching instruction, and the network standard switching instruction is used to instruct the terminal device to be handed over to a 4G network, the terminal device detects a current status of a high data rate (High Data Rate, HDR) link layer. If the HDR link layer is in a connected state, the link is released, an uplink data stream is intercepted and cached (where data is not disconnected), a tinier is enabled, and the uplink data stream is further opened after approximately 4 s (where the time of 4 s is used to block uplink data from an AP to prevent the link from entering the connected state again, and PS paging from the network needs to be blocked). If the HDR link layer is in a disconnected state, a command is directly conveyed to a lower layer to perform reselection, and the command is not cached. If the command has been cached, a mode command preferentially selected by a system is executed after 2 s. In this case, the status of the link layer is no longer determined, and a subsequent procedure continues to be performed.

In the prior art, when a terminal device needs to send application-layer data, and there is no network link between the terminal device and a base station, the terminal device requests a base station corresponding to a network in which the terminal device is currently located, to establish a network link. When the terminal device receives a paging message in a PS domain sent by a network, if there is no network link between the terminal device and the network side, the terminal device also requests the base station corresponding to the network in which the terminal device is currently located, to establish a network link.

In this application, to prevent the terminal device from establishing a network connection to the first-priority network, after the network link between the terminal device and the currently accessed first base station is released, establishment of the network connection to the first-priority network needs to be suspended. Optionally, the terminal device may intercept and cache to-be-sent uplink application-layer data of the terminal device, and discard the paging message in the packet switched PS domain that is sent by the first-priority network to the terminal device. In this way, the terminal device and the first-priority network can be effectively prevented from re-establishing the network link.

Optionally, the terminal device may intercept and cache the to-be-sent application-layer data of the terminal device by using the following feasible implementation: sending, by the terminal device, an application-layer data interception instruction to a TCP/IP kernel of the terminal device by using a modem of the terminal device, so that the TCP/IP kernel of the terminal device caches the to-be-sent application-layer data, and cancels sending the to-be-sent application-layer data. Optionally, the TCP/IP kernel is located in an application-layer processor in the terminal device. The application-layer data may be data corresponding to an application program in the terminal device. When sending data, the terminal device needs to send the data by using the TCP/IP kernel of the terminal device. Therefore, the application-layer data interception instruction may be sent to the TCP/IP kernel by using the modem. In this way, the TCP/IP kernel may intercept and cache the to-be-sent application-layer data based on the application-layer data interception instruction. Optionally, the TCP/IP kernel may cancel sending the to-be-sent application-layer data, and cache the to-be-sent application-layer data.

After releasing the network link between the terminal device and the first base station, intercepting and caching the to-be-sent application-layer data, and discarding the paging message in the packet switched PS domain that is sent by the first-priority network to the terminal device, the terminal device may be handed over to the target network. Optionally, the terminal device may search for the target network, determine a target base station corresponding to the target network, and request to establish a network link with the target base station, so that the terminal device accesses the target network.

To avoid loss of uplink data sent by the terminal device, after being handed over to the target network, the terminal device may send the to-be-sent application-layer data to the target base station by using the target network, so that the target base station processes the received application-layer data, for example, sends the application-layer data to a corresponding application server. In this way, a problem of the loss of the uplink data sent by the terminal device during network handover can be effectively avoided.

Optionally, in a process of network handover, the first base station may continue sending data to the terminal device. However, there is no network link between the first base station and the terminal device, and the terminal device discards the paging message that is in the PS domain and that is from the first base station, the first base station cannot successfully send downlink data to the terminal device. However, the first base station may obtain, through determining, whether the downlink data is successfully sent. When the downlink data is not successfully sent, the first base station may cache the downlink data not successfully sent. After the terminal device completes the network handover, a second base station accessed by the terminal device after the handover may perform transfer processing with the first base station, to obtain the downlink data not successfully sent to the terminal device by the first base station, and send the downlink data to the terminal device.

It should be noted that in a WCDMA network, the network link between the terminal device and the currently accessed first base station may be released with reference to content in 3GPP 25331, Section 8.1.14 (signaling connection release indication procedure, where the signaling connection release indication procedure is used by the UE to indicate to the UTRAN that one of its signaling connections has been released). In a CDMA network, the network link between the terminal device and the currently accessed first base station may be released with reference to content in 3GPP2 C.S0024, Section 7.7.6 (procedures and messages for the in-use instance of the protocol, where the access terminal shall send a connection close message to the access network and 6 perform the cleanup procedures defined in 7.7.6.1.2.1.2.).

In the network standard switching method provided in this embodiment of the present invention, in a process in which the terminal device is handed over to a high-priority network, the terminal device intercepts and caches the uplink application-layer data needing to be sent, and after the network handover succeeds, further sends the intercepted uplink application-layer data, thereby avoiding the loss of the uplink data. The second base station accessed by the terminal device after the handover may perform transfer processing with the first base station, to obtain the downlink data not successfully sent to the terminal device by the first base station, and send the downlink data to the terminal device, thereby avoiding the loss of the downlink data. In the foregoing process, the network handover is performed in a process of transmitting a small amount of data by the terminal device, and the loss of the uplink data and the downlink can be avoided, thereby improving reliability of the network handover.

Based on the foregoing embodiment, to further reduce impact on a user service in a network standard switching process, before switching a network standard, the terminal device may further obtain an uplink data volume and a downlink data volume in a preset time period, and switch the network standard when the uplink data volume and the downlink data volume are relatively small. Specifically, refer to an embodiment shown in FIG. 4.

Figure 4:
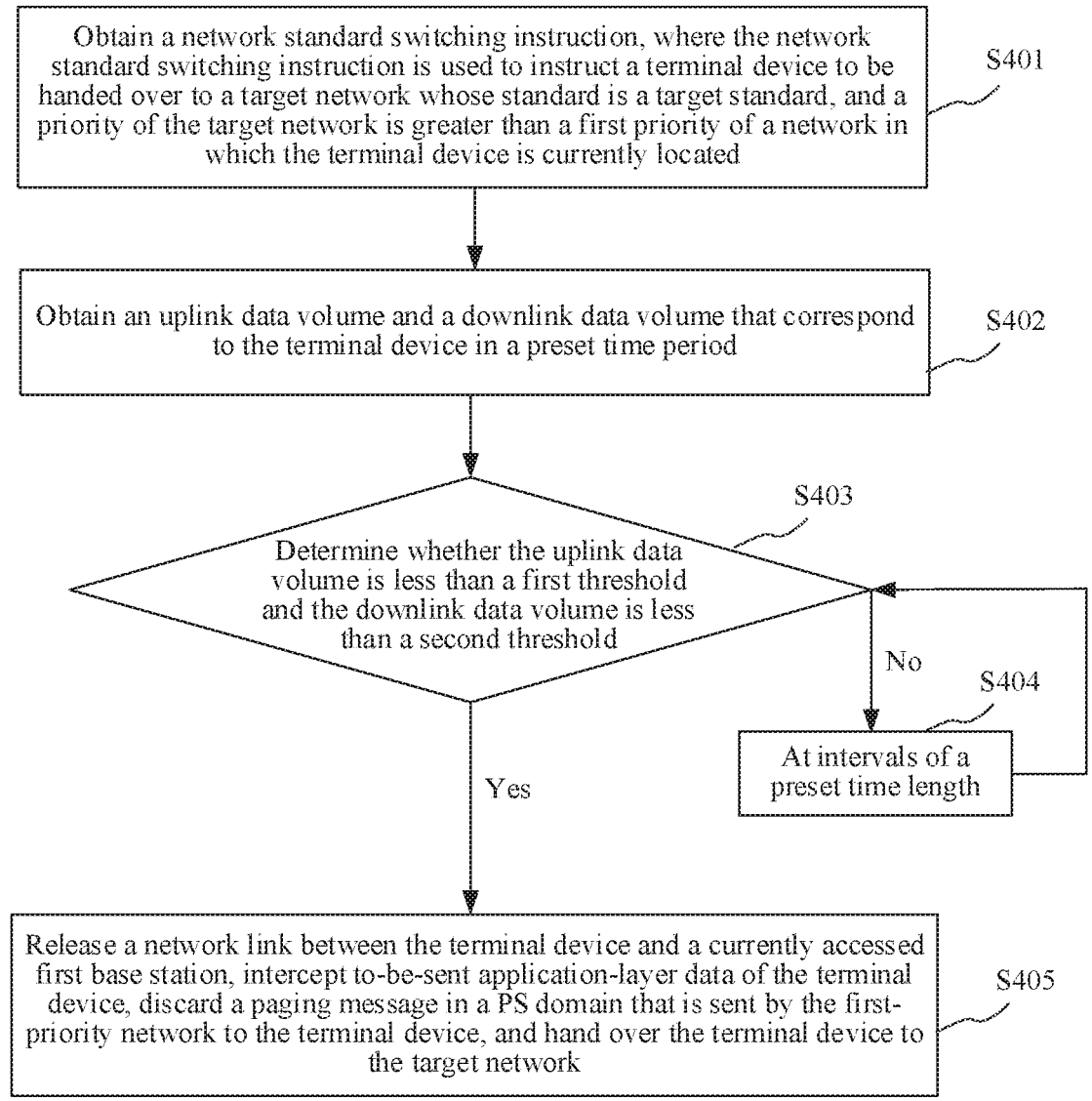
FIG. 4 is a second schematic flowchart of a network standard switching method according to an embodiment of the present invention.

FIG. 4 is a second schematic flowchart of a network standard switching method according to an embodiment of the present invention. Referring to FIG. 4, the method may include the following steps.

S401: Obtain a network standard switching instruction, where the network standard switching instruction is used to instruct a terminal device to be handed over to a target network whose standard is a target standard, and a priority of the target network is greater than a first priority of a network in which the terminal device is currently located.

It should be noted that for a process of performing S401, refer to S201, and details are not described herein again.

S402: Obtain an uplink data volume and a downlink data volume that correspond to the terminal device in a preset time period.

After obtaining the network standard switching instruction, the terminal device further obtains the uplink data volume and the downlink data volume of the terminal device in the preset time period.

Optionally, the preset time period may be a period of time before or after the terminal device receives the network standard switching instruction. For example, the preset time period may be two seconds or three seconds. In an actual application process, the preset time period may be set based on an actual requirement.

Optionally, the uplink data volume may be a quantity of packets sent by the terminal device to a base station in the preset time period, or may be a size of data sent by the terminal device to a base station in the preset time period. Optionally, the downlink data volume may be a quantity of packets sent by the base station to the terminal device in the preset time period, or may be a size of data sent by the base station to the terminal device in the preset time period.

S403: Determine whether the uplink data volume is less than a first threshold and the downlink data volume is less than a second threshold.

If the uplink data volume is less than the first threshold and the downlink data volume is less than the second threshold, perform S405. If the uplink data volume is not less than the first threshold or the downlink data volume is not less than the second threshold, perform S404.

Optionally, the first threshold and the second threshold may be preset in the terminal device. The first threshold is a largest uplink data volume that exists when network handover can be directly performed, and the second threshold is a largest downlink data volume that exists when the network handover can be directly performed.

When the uplink data volume is a quantity of packets sent by the terminal device to the base station in the preset time period, the first threshold is a largest quantity of packets that exists when the network handover can be directly performed. For example, the first threshold may be 10. When the uplink data volume is a size of data sent by the terminal device to the base station in the preset time period, the first threshold is largest data traffic that exists when the network handover can be directly performed. For example, the first threshold may be 5 KB.

When the downlink data volume is a quantity of packets sent by the base station to the terminal device in the preset time period, the second threshold is a largest quantity of packets that exists when the network handover can be directly performed. For example, the second threshold may be 15. When the downlink data volume is a size of data sent by the base station to the terminal device in the preset time period, the second threshold is largest data traffic that exists when the network handover can be directly performed. For example, the second threshold may be 8 KB.

It should be noted that the first threshold and the second threshold may be the same or may be different. In an actual application process, the first threshold and the second threshold may be set based on an actual requirement. This is not specifically limited in this embodiment of the present invention.

Certainly, in the actual application process, the terminal device may further obtain a data rate of the terminal device in the preset time period, and determine whether to perform S404 based on the data rate of the terminal device in the preset time period. Alternatively, the terminal device may further obtain a data volume of the terminal device per unit time, and determine whether to perform S404 based on the data volume of the terminal device per unit time.

Certainly, the terminal device may further determine whether to perform S404 based on only the uplink data volume or only the downlink data volume. This is not specifically limited in this embodiment of the present invention.

S404: At intervals of a preset time length.

After S404, perform S402.

When the terminal device determines that the uplink data volume is greater than or equal to the first threshold or the downlink data volume is greater than or equal to the second threshold, it indicates that the current uplink data volume or the current downlink data volume is relatively large, and network handover cannot be directly performed. At intervals of the preset time length, the terminal device obtains the uplink data volume and the downlink data volume again, and determines whether the uplink data volume is less than the first threshold and the downlink data volume is less than the second threshold; and if the uplink data volume is less than the first threshold and the downlink data volume is less than the second threshold, performs S405; or if the uplink data volume is not less than the first threshold or the downlink data volume is not less than the second threshold, continues obtaining the uplink data volume and the downlink data volume again at intervals of the preset time length, and so on, until the obtained uplink data volume is less than the first threshold and the downlink data volume is less than the second threshold.

Optionally, when the terminal device needs to obtain the uplink data volume and the downlink data volume at intervals of the preset time length, the terminal device may start a timer. When a time length of the timer is equal to the preset time length, the terminal device obtains the uplink data volume and the downlink data volume.

S405: Release a network link between the terminal device and a currently accessed first base station, intercept to-be-sent application-layer data of the terminal device, discard a paging message in a PS domain that is sent by the first-priority network to the terminal device, and hand over to the target network.

It should be noted that for a process of performing S405, refer to S202, and details are not described herein again.

The method described in the foregoing embodiment is described below in detail with reference to FIG. 5 and by using a specific example.

For example, it is assumed that a network in which a terminal device is currently located is a CDMA network (a 2G network), and a network link is currently established between the terminal device and a base station 1. A network to which the terminal device needs to be handed over is a CDMA2000 network (a 3G network).

Figure 5:
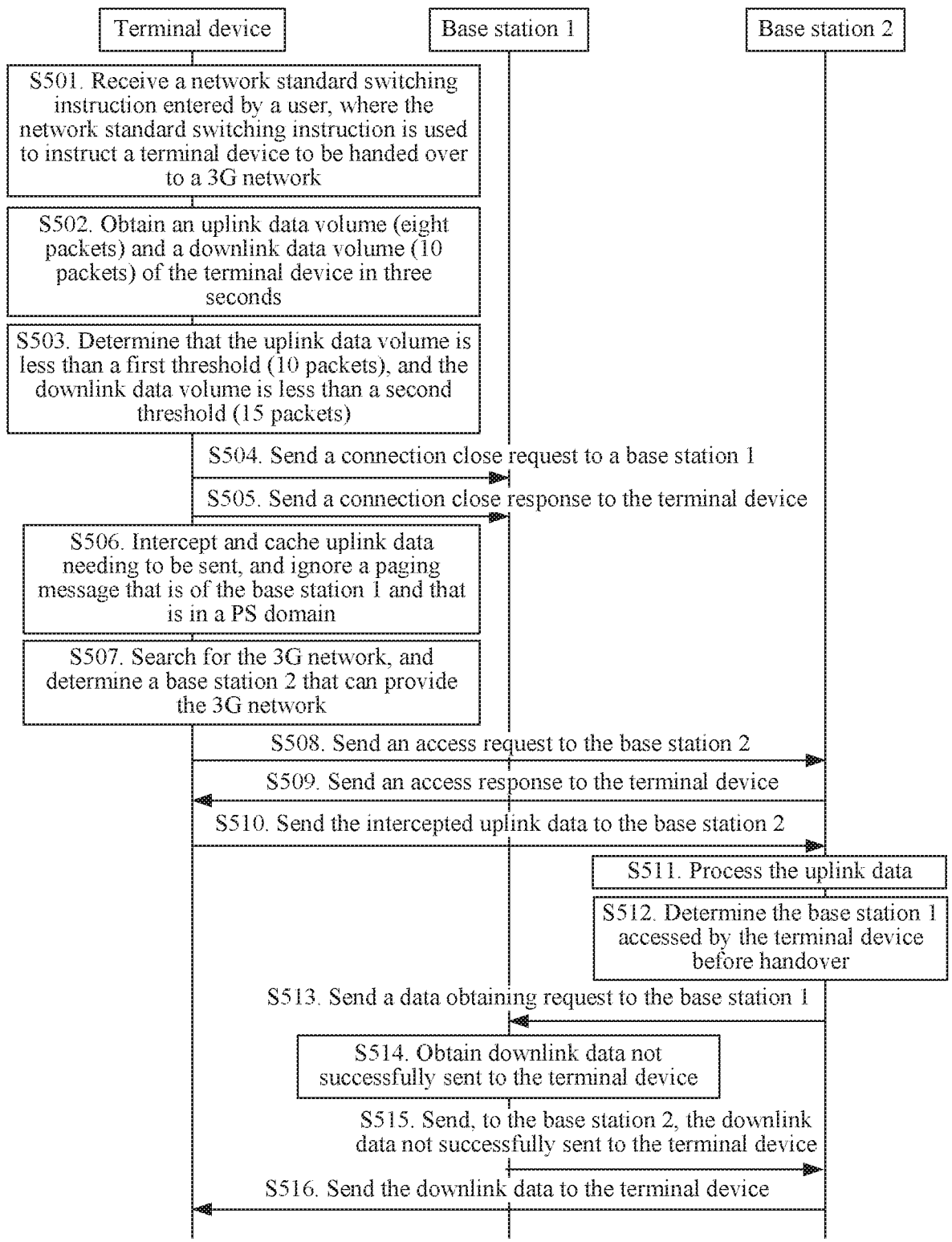
FIG. 5 is a third schematic flowchart of a network standard switching method according to an embodiment of the present invention.

FIG. 5 is a third schematic flowchart of a network standard switching method according to an embodiment of the present invention. Referring to FIG. 5, the method may include the following steps.

S501: The terminal device receives a network standard switching instruction entered by a user, where the network standard switching instruction is used to instruct the terminal device to be handed over to a 3G network.

S502: The terminal device obtains an uplink data volume (eight packets) and a downlink data volume (10 packets) of the terminal device in three seconds.

It is assumed that a first threshold is 10 packets, and a second threshold is 15 packets.

S503: The terminal device determines that the uplink data volume (eight packets) is less than a first threshold (10 packets), and the downlink data volume (10 packets) is less than a second threshold (15 packets).

S504: The terminal device sends a connection close request to the base station 1.

S505: The base station 1 sends a connection close response to the terminal device.

According to S504 and S505, the network link between the terminal device and the base station 1 is disconnected.

S506: The terminal device intercepts and caches uplink data needing to be sent, and discards a paging message that is of the base station 1 and that is in a PS domain.

The uplink data is application-layer data sent by the terminal device. Optionally, the terminal device sends an application-layer data interception instruction to a TCP/IP kernel by using a modern, so that the TCP/IP kernel intercepts the uplink data needing to be sent, and caches the uplink application-layer data.

S507: The terminal device searches for the 3G network, and determines a base station 2 that can provide the 3G network.

S508: The terminal device sends an access request to the base station 2.

S509: The base station 2 sends an access response to the terminal device.

According to S508 and S509, a network link is established between the terminal device and the base station 2.

S510: The terminal device sends the intercepted uplink data to the base station 2.

S511: The base station 2 processes the uplink data.

S512: The base station 2 determines the base station 1 accessed by the terminal device before handover.

S513: The base station 2 sends a data obtaining request to the base station 1, where the data obtaining request includes an identifier of the terminal device.

S514: The base station 1 obtains downlink data not successfully sent to the terminal device.

S515: The base station 1 sends, to the base station 2, the downlink data not successfully sent to the terminal device.

S516: The base station 2 sends the downlink data to the terminal device.

When the terminal device needs to be handed over from the 2G network to the 3G network, network handover is performed when the uplink data volume and the downlink data volume that correspond to the terminal device are both less than corresponding thresholds. Further, in a process in which the terminal device is handed over from the 2G network to the 3G network, the terminal device caches the to-be-sent uplink data (the application-layer data), and continues to send the cached uplink data after the network handover succeeds, thereby avoiding loss of the uplink data. Further, after the network handover of the terminal device succeeds, the base station 2 requests, from the base station 1, the downlink data not successfully sent by the base station 1, and sends, to the terminal device, the downlink data not successfully sent by the base station 1, thereby avoiding loss of the downlink data, and improving reliability of the network handover.

Figure 6:
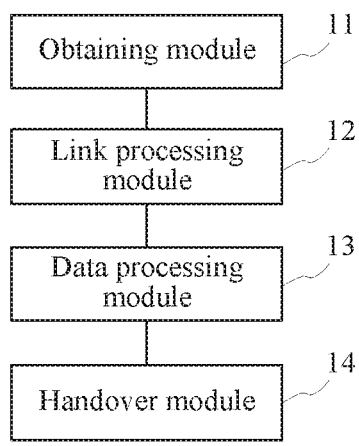
FIG. 6 is a first schematic structural diagram of a network standard switching apparatus according to an embodiment of the present invention.

FIG. 6 is a first schematic structural diagram of a network standard switching apparatus according to an embodiment of the present invention. Referring to FIG. 6, the apparatus may include an obtaining module 11, a link processing module 12, a data processing module 13, and a handover module 14.

The obtaining module 11 is configured to obtain a network standard switching instruction. The network standard switching instruction is used to instruct a terminal device to be handed over to a target network whose standard is a target standard, and a priority of the target network is greater than a first priority of a network in which the terminal device is currently located.

The link processing module 12 is configured to release a network link between the terminal device and a currently accessed first base station.

The data processing module 13 is configured to: intercept and cache to-be-sent application-layer data of the terminal device, and discard a paging message in a packet switched PS domain that is sent by the first-priority network to the terminal device.

The handover module 14 is configured to hand over the terminal device to the target network.

The network standard switching apparatus provided in this embodiment of the present invention can perform the technical solution described in the foregoing method embodiment. An implementation principle and a beneficial effect thereof are similar, and details are not described herein again.

In a possible implementation, before the link processing module 12 releases the network link between the terminal device and the currently accessed first base station, the obtaining module 11 is further configured to:

obtain an uplink data volume and a downlink data volume that correspond to the terminal device in a preset time period; and determine that the uplink data volume is less than a first threshold and the downlink data volume is less than a second threshold.

In another possible implementation, when the obtaining module 11 determines that the uplink data volume is greater than or equal to the first threshold or the downlink data volume is greater than or equal to the second threshold, and before the link processing module releases the network link between the terminal device and the currently accessed first base station, the obtaining module 11 is further configured to:

obtain the uplink data volume and the downlink data volume of the terminal device in the preset time period at intervals of a preset time length, until the obtained uplink data volume is less than the first threshold and the obtained downlink data volume is less than the second threshold.

In another possible implementation, the data processing module 13 is specifically configured to:

send an application-layer data interception instruction to a Transmission Control Protocol TCP/Internet Protocol IP kernel of the terminal device by using a modem of the terminal device, so that the TCP/IP kernel of the terminal device caches the to-be-sent application-layer data.

In another possible implementation, the handover module 14 is specifically configured to:

search for the target network;

determine a target base station corresponding to the target network; and request to establish a network link with the target base station.

Figure 7:
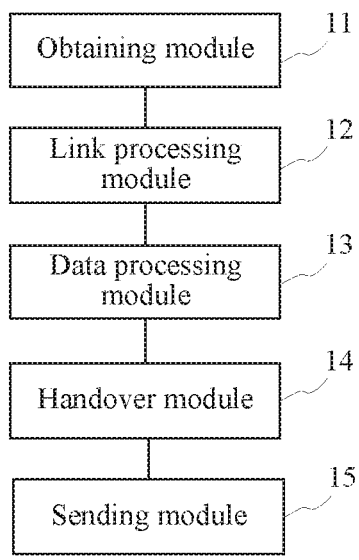
FIG. 7 is a second schematic structural diagram of a network standard switching apparatus according to an embodiment of the present invention.

FIG. 7 is a second schematic structural diagram of a network standard switching apparatus according to an embodiment of the present invention. Based on the embodiment shown in FIG. 6, referring to FIG. 7, the apparatus further includes a sending module 15.

The sending module 15 is configured to: after the handover module hands over the terminal device to the target network, send the cached to-be-sent application-layer data to the target base station by using the target network.

The network standard switching apparatus provided in this embodiment of the present invention can perform the technical solution described in the foregoing method embodiment. An implementation principle and a beneficial effect thereof are similar, and details are not described herein again.

Figure 8:
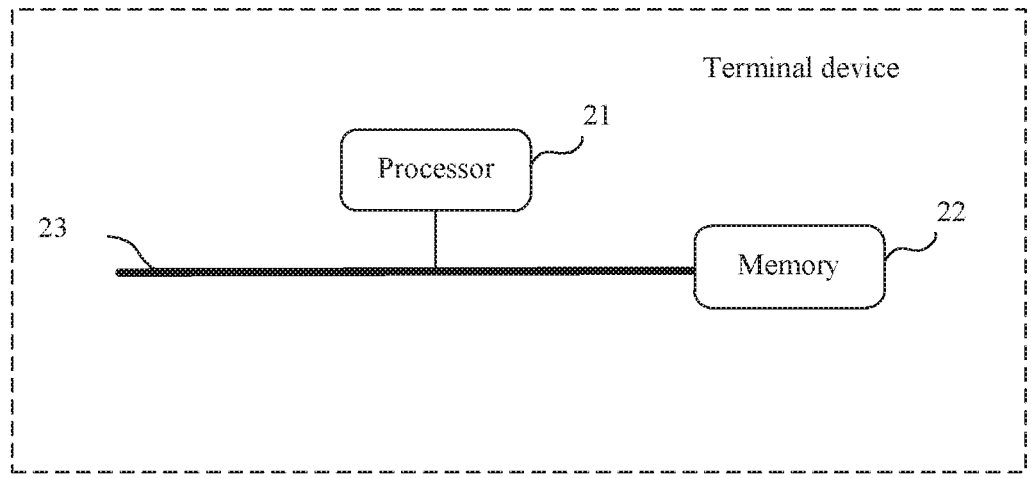
FIG. 8 is a first schematic structural diagram of a terminal device according to an embodiment of the present invention.

FIG. 8 is a first schematic structural diagram of a terminal device according to an embodiment of the present invention. Referring to FIG. 8, the terminal device includes a processor 21, a memory 22, and a communications bus 23. The memory 22 is configured to store a program instruction. The memory 22 may include one or more of a read-only memory (read-only memory, ROM), a random access memory (random access memory, RAM), and a magnetic disk storage. The communications bus 23 is configured to implement a connection between components. The processor 21 may be a general-purpose central processing unit, one or more integrated circuits configured to control execution of a program, a hardware circuit developed by using an FPGA, a baseband processor, and the like. The processor 21 is configured to: read the program instruction in the memory, and perform the following operations:

obtaining a network standard switching instruction, where the network standard switching instruction is used to instruct the terminal device to be handed over to a target network whose standard is a target standard, and a priority of the target network is greater than a first priority of a network in which the terminal device is currently located; and releasing a network link between the terminal device and a currently accessed first base station, intercepting and caching to-be-sent application-layer data of the terminal device, discarding a paging message in a packet switched PS domain that is sent by the first-priority network to the terminal device, and handing over the terminal device to the target network.

The terminal device provided in this embodiment of the present invention can perform the technical solution described in the foregoing method embodiment. An implementation principle and a beneficial effect thereof are similar, and details are not described herein again.

In a possible implementation, before the processor 21 releases the network link between the terminal device and the currently accessed first base station, the processor 21 is further configured to:

obtain an uplink data volume and a downlink data volume that correspond to the terminal device in a preset time period; and determine that the uplink data volume is less than a first threshold and the downlink data volume is less than a second threshold.

In another possible implementation, when the processor 21 determines that the uplink data volume is greater than or equal to the first threshold or the downlink data volume is greater than or equal to the second threshold, and before the processor releases the network link between the terminal device and the currently accessed first base station, the processor 21 is further configured to:

obtain the uplink data volume and the downlink data volume of the terminal device in the preset time period at intervals of a preset time length, until the obtained uplink data volume is less than the first threshold and the obtained downlink data volume is less than the second threshold.

In another possible implementation, the processor 21 is specifically configured to:

send an application-layer data interception instruction to a Transmission Control Protocol TCP/Internet Protocol IP kernel of the terminal device by using a modem of the terminal device, so that the TCP/IP kernel of the terminal device caches the to-be-sent application-layer data.

In another possible implementation, the processor 21 is specifically configured to:

search for the target network;

determine a target base station corresponding to the target network; and request to establish a network link with the target base station.

Figure 9:
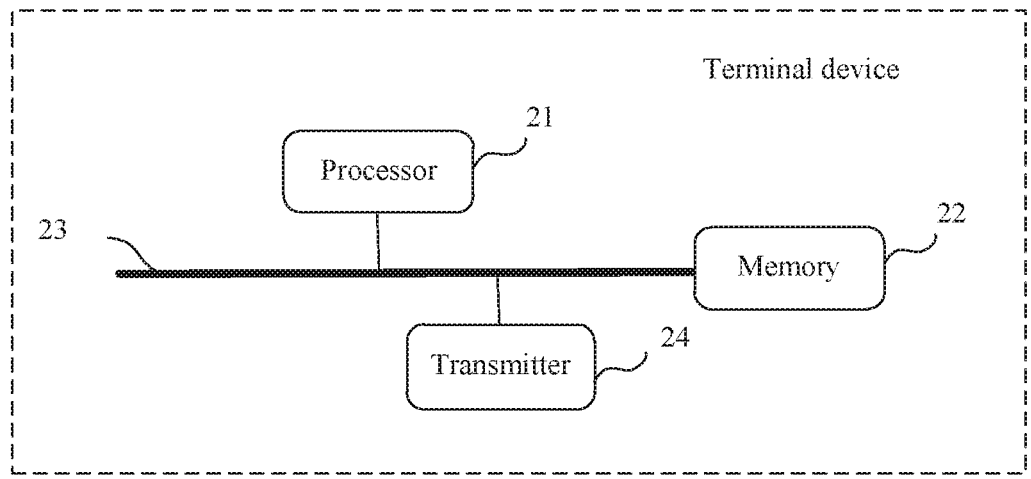
FIG. 9 is a second schematic structural diagram of a terminal device according to an embodiment of the present invention.

FIG. 9 is a second schematic structural diagram of a terminal device according to an embodiment of the present invention. Based on the embodiment shown in FIG. 8, referring to FIG. 9, the terminal device further includes a transmitter 24. The transmitter 24 is configured to: after the processor 21 hands over the terminal device to the target network, send the cached to-be-sent application-layer data to the target base station by using the target network.

The terminal device provided in this embodiment of the present invention can perform the technical solution described in the foregoing method embodiment. An implementation principle and a beneficial effect thereof are similar, and details are not described herein again.

What is claimed is:

1. A network switching method implemented by a terminal device, wherein the network switching method comprises:

obtaining a network switching instruction that instructs the terminal device to be handed over to a target network, wherein a priority of the target network is greater than a first priority of a first network in which the terminal device is currently located;

repeatedly obtaining, within time intervals of a preset time period, an uplink data volume and a downlink data volume corresponding to the terminal device until the uplink data volume is less than a first threshold and the downlink data volume is less than a second threshold, wherein the uplink data volume comprises a first quantity of packets or a first size of data sent by the terminal device to a currently accessed first base station in the preset time period, and wherein the downlink data volume comprises a second quantity of packets or a second size of data received by the terminal device from the currently accessed first base station in the preset time period;

releasing a first network link between the terminal device and the currently accessed first base station when the uplink data volume is less than the first threshold and the downlink data volume is less than the second threshold;

intercepting to-be-sent application-layer data of the terminal device;

caching the to-be-sent application-layer data of the terminal device;

discarding a paging message in a packet switched (PS) domain received from the first network; and handing over the terminal device to the target network.

2. The network switching method of claim 1, wherein intercepting the to-be-sent application-layer data of the terminal device and caching the to-be-sent application-layer data of the terminal device comprises sending, using a modem of the terminal device, an application-layer data interception instruction to a Transmission Control Protocol (TCP)/Internet Protocol (IP) kernel of the terminal device to cause the TCP/IP kernel of the terminal device to cache the to-be-sent application-layer data.

3. The network switching method of claim 1, wherein handing over the terminal device to the target network comprises:

searching for the target network;

determining a target base station corresponding to the target network; and establishing a second network link with the target base station.

4. The network switching method of claim 3, wherein after handing over the terminal device to the target network, the network switching method further comprises sending the to-be-sent application-layer data to the target base station using the target network.

5. The network switching method of claim 1, further comprising:

providing a user interface on a screen of the terminal device; and receiving a user selection from the user interface that sets the priority of the target network.

6. The network switching method of claim 1, wherein the first threshold associated with the uplink data volume is less than the second threshold associated with downlink data volume.

7. The network switching method of claim 1, wherein the first network comprises a Second Generation (2G) network, and wherein the target network comprises a Third Generation (3G) network.

8. The network switching method of claim 1, wherein the preset time period comprises a period of two or three seconds before the terminal device receives the network switching instruction.

9. The network switching method of claim 1, wherein the preset time period comprises a period of two or three seconds after the terminal device receives the network switching instruction.

10. The network switching method of claim 1, wherein the first threshold comprises a largest uplink data volume that exists when a network handover can be directly performed, and wherein the second threshold comprises a largest downlink data volume that exists when the network handover can be directly performed.

11. The network switching method of claim 1, wherein the first quantity of packets comprises 10 packets, wherein the first size of data comprises 5 kilobytes (KB), wherein the second quantity of packets comprises 15 packets, and wherein the second size of data comprises 8 KB.

12. The network switching method of claim 1, wherein the preset time period comprises 3 seconds.

13. An apparatus, comprising:

at least one processor; and a memory coupled to the at least one processor and storing programming instructions that, when executed by the at least one processor, cause the apparatus to:

obtain a network switching instruction that instructs a terminal device to be handed over to a target network, wherein a priority of the target network is greater than a first priority of a first network in which the terminal device is currently located;

repeatedly obtain, within time intervals of a preset time period, an uplink data volume and a downlink data volume corresponding to the terminal device until the uplink data volume is less than a first threshold and the downlink data volume is less than a second threshold, wherein the uplink data volume comprises a first quantity of packets or a first size of data sent by the terminal device to a currently accessed first base station in the preset time period, and wherein the downlink data volume comprises a second quantity of packets or a second size of data received by the terminal device from the currently accessed first base station in the preset time period;

release a first network link between the terminal device and the currently accessed first base station when the uplink data volume is less than the first threshold and the downlink data volume is less than the second threshold;

intercept and cache to-be-sent application-layer data of the terminal device;

discard a paging message in a packet switched (PS) domain received from the first network to the terminal device; and hand over the terminal device to the target network.

14. The apparatus of claim 13, wherein when executed by the at least one processor, the programming instructions further cause the apparatus to send, using a modem of the terminal device, an application-layer data interception instruction to a Transmission Control Protocol (TCP)/Internet Protocol (IP) kernel of the terminal device to cause the terminal device to cache the to-be-sent application-layer data.

15. The apparatus of claim 13, wherein when executed by the at least one processor, the programming instructions further cause the apparatus to:

search for the target network;

determine a target base station corresponding to the target network; and establish a second network link with the target base station.

16. The apparatus of claim 15, wherein when executed by the at least one processor, the programming instructions further cause the apparatus to send the to-be-sent application-layer data to the target base station using the target network.

17. A non-transitory computer-readable storage medium storing computer-readable program code that, when executed by a processor of a terminal device, causes the terminal device to:

obtain a network switching instruction that instructs the terminal device to be handed over to a target network, wherein a priority of the target network is greater than a first priority of a first network in which the terminal device is currently located;

repeatedly obtain, within time intervals of a preset time period, an uplink data volume and a downlink data volume corresponding to the terminal device until the uplink data volume is less than a first threshold and the downlink data volume is less than a second threshold, wherein the uplink data volume comprises a first quantity of packets or a first size of data sent by the terminal device to a currently accessed first base station in the preset time period, and wherein the downlink data volume comprises a second quantity of packets or a second size of data received by the terminal device from the currently accessed first base station in the preset time period;

release a first network link between the terminal device and the currently accessed first base station when the uplink data volume is less than the first threshold and the downlink data volume is less than the second threshold;

intercept and cache to-be-sent application-layer data of the terminal device;

discard a paging message in a packet switched (PS) domain received from the first network to the terminal device; and hand over the terminal device to the target network.

18. The non-transitory computer-readable storage medium of claim 17, wherein the computer-readable program code is further configured to cause the terminal device to send, using a modem of the terminal device, an application-layer data interception instruction to a Transmission Control Protocol (TCP)/Internet Protocol (IP) kernel of the terminal device to cause the terminal device to cache the to-be-sent application-layer data.

19. The non-transitory computer-readable storage medium of claim 17, wherein the computer-readable program code is further configured to cause the terminal device to, when handing over the terminal device to the target network:

search for the target network;

determine a target base station corresponding to the target network; and establish a second network link with the target base station.

20. The non-transitory computer-readable storage medium of claim 19, wherein the computer-readable program code is further configured to cause the terminal device to send the to-be-sent application-layer data to the target base station using the target network.

* * * * *